(12) United States Patent
Brown

(10) Patent No.: US 7,361,801 B1
(45) Date of Patent: Apr. 22, 2008

(54) METHODS FOR IMMOBILIZATION OF NITRATE AND NITRITE IN AQUEOUS WASTE

(75) Inventor: Paul W Brown, State College, PA (US)

(73) Assignee: 352 East Irvin Avenue Limited Partnership, State College, PA (US)

( * ) Notice: Subject to any disclaimer, the term of this patent is extended or adjusted under 35 U.S.C. 154(b) by 656 days.

(21) Appl. No.: 10/648,893

(22) Filed: Aug. 27, 2003

(51) Int. Cl.
*A62D 3/00* (2007.01)
(52) U.S. Cl. ..................................................... 588/410
(58) Field of Classification Search ............... 588/2, 588/18, 20, 317, 400, 410, 252
See application file for complete search history.

(56) References Cited

U.S. PATENT DOCUMENTS

| 3,274,784 | A |   | 9/1966  | Shock et al.      |       |
|-----------|---|---|---------|-------------------|-------|
| 4,028,265 | A |   | 6/1977  | Barney et al.     |       |
| 4,274,880 | A |   | 6/1981  | Chappell          |       |
| 4,344,872 | A |   | 8/1982  | Thiele            |       |
| 4,354,954 | A |   | 10/1982 | Koster et al.     |       |
| 4,853,208 | A |   | 8/1989  | Reimers et al.    |       |
| 4,892,685 | A |   | 1/1990  | Magnin et al.     |       |
| 5,049,412 | A |   | 9/1991  | Miller            |       |
| 5,198,082 | A |   | 3/1993  | Vennesland et al. |       |
| 5,269,975 | A | * | 12/1993 | Noakes            | 588/3 |
| 5,422,141 | A |   | 6/1995  | Hoopes et al.     |       |
| 5,435,846 | A |   | 7/1995  | Tatematsu et al.  |       |
| 5,498,828 | A | * | 3/1996  | Matsuda et al.    | 588/3 |
| 5,539,140 | A |   | 7/1996  | Davidovits        |       |
| 5,545,797 | A |   | 8/1996  | Ewing et al.      |       |
| 5,640,704 | A |   | 6/1997  | Snyder et al.     |       |
| 5,960,368 | A | * | 9/1999  | Pierce et al.     | 588/10 |
| 6,402,990 | B1 |  | 6/2002  | Marazzani et al.  |       |

FOREIGN PATENT DOCUMENTS

| CA | 1258473     | 8/1989  |
|----|-------------|---------|
| JP | 09286652 A  | 11/1997 |
| JP | 410231157 A | 9/1998  |

* cited by examiner

*Primary Examiner*—Edward M. Johnson
(74) *Attorney, Agent, or Firm*—Daniel P. Cillo; Eckert Seamans Cherin & Mellott, LLC

(57) ABSTRACT

The present invention relates to a method of immobilizing aqueous waste, including low level nuclear waste, by converting the waste to a solid. Solidification is accomplished with the addition of a compound having the formula $Me(II)O$ or $Me(II)(OH)_2$ in combination with compounds of the general formula $Me(II)O.R_2O_3$, $R_2O_3$, $R(OH)_3$ or $ROOH$, where Me is a cation selected from the group consisting of Ca, Ba, Sr, Mn, and Zn, and R is selected from the group consisting of Al, Fe and Cr. Exemplary compounds of the above formula include commercially available calcium aluminate cements, which when added to the waste in combination with a hydroxide of a divalent metal, bind the nitrate ions or nitrite ions in the waste and convert it to a solid.

14 Claims, No Drawings

METHODS FOR IMMOBILIZATION OF NITRATE AND NITRITE IN AQUEOUS WASTE

FIELD OF THE INVENTION

The present invention relates to a method of immobilizing aqueous waste, including low level nuclear waste, by converting the waste to a solid. Solidification is accomplished with the addition of a compound having the formula Me(II)O or Me(II)(OH)$_2$ in combination with compounds of the general formula Me(II)O.R$_2$O$_3$, R$_2$O$_3$, R(OH)$_3$ or ROOH, where Me is a cation selected from the group consisting of Ca, Ba, Sr, Mn, and Zn, and R is selected from the group consisting of Al, Fe and Cr. Exemplary compounds of the above formula include commercially available calcium aluminate cements, which when added to the waste in combination with a hydroxide of a divalent metal, bind the nitrate ions or nitrite ions in the waste and convert it to a solid.

BACKGROUND INFORMATION

Nitrates and nitrites may be present in aqueous wastes for a variety of reasons. For example, processing of nuclear materials generates enormous amounts of aqueous low level radioactive wastes. These aqueous wastes frequently contain large amounts of nitrates and nitrites, usually in the form of sodium nitrate or nitrite.

Most manufacturing industries generate nitrate waste. Nitrates appear on the Clean Water Act's list of 126 priority pollutants published in 40CFR 122, Appendix D. They also appear on the EPA's Toxic Release Inventory (TRI) where they are 18th out of 100 prime pollutants. Industrial nitrate waste generators are forced by the regulations and by the public to reduce or eliminate nitrate discharges to the environment.

Generation of nitrate wastes by various industries is vast. According to the EPA's TRI database, the total production-related nitrate waste amounted to 781 million lb. in 1997. Among the major generators are manufacturers of chemicals and allied products (SIC code 28; 430 million lb.), including industrial organic chemicals (SIC no. 2869), nitrogenous fertilizers (SIC no. 2873), industrial inorganic chemicals (SIC no. 2819), organic fibers (SIC no. 2824) and plastic materials and resins (SIC no. 2821); primary metal industries (SIC code 33; 134 million lb.), including blast furnaces and steel mills (SIC no. 3312); food and kindred products (SIC code 20; 72 million lb.); and electronic & other electric equipment (SIC code 36; 45 million lb.).

Economical and environmentally safe methods of disposing of nitrate and nitrite-containing aqueous waste, including low level nuclear wastes, have been sought for years. Many of the methods involve the addition of clay or Portland cement to the liquid waste, in combination with various other materials, to solidify the waste and prevent leaching of radioactive or other hazardous materials from storage locations. For example, U.S. Pat. No. 3,274,784, describes the solidification and immobilization of radioactive waste solutions by the addition of clay, lime and caustic. U.S. Pat. No. 5,640,704 describes a method and process for immobilizing radioactive species within a waste material, through the addition of Portland cement in combination with an iron complexant compound, to form a solid material which is then allowed to cure and solidify. U.S. Pat. No. 4,853,208 describes a method of detoxifying hazardous wastes by mixing the waste with silicate and a setting agent such as Portland cement, lime, gypsum or calcium chloride. U.S. Pat. No. 4,354,954 provides a method of solidifying and disposing of aqueous radioactive wastes, whereby the waste is evaporated, the pH is set with the addition of a highly alkaline solution, and the resulting material is spray-dried on a clay-like additive material and pelletized. U.S. Pat. No. 5,545,797 discloses a method of immobilizing plutonium waste with SiO$_2$, the resulting mixture being further cold pressed and then heated under pressure to form the final waste product. U.S. Pat. No. 4,028,265 provides a method of converting sodium nitrate-containing wastes to a solid form by reacting the waste with an aluminosilicate clay at a temperature of from 30° to 100° C., to trap the dissolved radioactive salts in the aluminosilicate matrix. None of the above patents teach immobilization of nitrate or nitrite ions.

Numerous other methods exist for solidifying aqueous waste material. However, these methods consume limited amounts of water in the formation of hydrated compounds which have little or no capacity for incorporating the anionic species dissolved in the aqueous waste into a crystalline solid and which cannot engulf the remaining aqueous waste in the pore structures of the solids which form. None of these methods teach the formation of crystalline compounds whose formation relies on the incorporation of species dissolved in the waste into their crystalline structures.

In the above described methods, large amounts of grouts, e.g. clay, Portland cement, fly ash, or other additive materials, are needed to form a solid material, thus producing a solid waste in large quantities, thus increasing the costs of processing and storage. There also remains a need, therefore, for methods of immobilizing aqueous low level radioactive wastes to provide a smaller volume of solid waste material, to minimize the space required for storage and disposal of such wastes. The extent to which this can be accomplished is related to the molar ratio of moles of water consumed per mole of crystalline solid formed.

SUMMARY OF THE INVENTION

The present invention solve the above needs, by providing a method of immobilizing nitrate and nitrites species in aqueous waste, including low level nuclear wastes, and allowing the waste to solidify. This is accomplished by the addition of a compound having the formula Me(II)O or Me(II)(OH)$_2$ and a compound selected from the group consisting of 1) a compound having the formula Me(II)O.R$_2$O$_3$, and 2) a compound having the formula R$_2$O$_3$, R(OH)$_3$ or ROOH. Me(II) is a cation selected from the group consisting of Ca, Ba, Sr, Mn, Zn and combinations thereof, and R is selected from the group consisting of Al, Fe, Cr and combinations thereof. The waste is thereafter allowed to solidify.

In one embodiment, a suitably reactive source of alumina is added, including, but not limited to, bauxite ore, commercially available alumina hydrates, transition aluminas, alpha alumina, and alumina-containing compounds having the formula Me(II)O.Al$_2$O$_3$, such as calcium aluminate cements, where Me(II) is a cation selected from the group consisting of Ca, Ba, Sr, Mn, Zn and combinations thereof. Alumina may be partially or completely replaced by Fe and Cr. The general formula of the compounds formed is 3Me (II)O.R$_2$O$_3$.Me(II)(NO$_x$)$_2$.nH$_2$O where R=Al, Fe or Cr, or combinations thereof, x=2 or 3 and n=10 or higher. Although Me(II) coordinated with NO$_x$ may be partially replaced by 2Na, the extent of such replacement has not been established.

The addition of these compounds to the waste results in the formation of a solid in which large amounts of water are taken up, as compared with prior art methods. For example, prior art methods in which calcium or other alkaline earth metal silicate or other silicate such as aluminosilicate is added to the waste will result in an uptake of about 4 moles of water per mole of silicate added, whereas in the method of the present invention a minimum of 10 moles or higher is taken up in the formation of the solid. This results in a greatly reduced volume of solid waste, as compared with prior methods. The prior art cited discloses the formation of calcium silicate hydrates as predominant compounds in formulations containing Portland cement; these typically contain 4 moles of water. Other compounds which can take up larger amounts of water, such as $3CaO.Al_2O_3.CaSO_4.12H_2O$, will be present in grout produced from Portland cement. However, this compound is present in only minor amounts (~est 5%), and does not contain nitrate or nitrite, nor will it convert to the nitrate compound.

Also in contrast to prior methods, the present invention results in the formation of hydrated compounds which have tremendous capacity for incorporating the anionic species dissolved in the aqueous waste into a crystalline solid and which engulf the remaining aqueous waste in the pore structures of the solids which form. The formation of the crystalline compounds of the present invention thus relies on the incorporation of species dissolved in the waste into their crystalline structures. This crystalline structure, referred to in the art as an "AFm phase", has been well documented. The archetype structure comprises layers of calcium and aluminum (or iron), such as $[Ca_2Al(OH)_6]^+$, and more generically as $[Me(II)_2R(OH)_6]^+$, and has water molecules and charge-compensating anions residing within the interlayer spaces. These compounds tend to crystallize as platy hexagonal crystals.

An additional advantage of the present invention lies in the nature of the reaction in which the solid is formed, the reaction being exothermic. Because the reaction is exothermic, a lower hydrate will tend to form initially, upon mixing, but as the waste form cools, a higher n hydrate will become stable and there will be a tendency to desiccate the waste form. This provides additional protection against a phenomenon known as "bleeding", in which droplets of solution appear on the exterior surface of the solid. None of the materials currently used in grout formation address this problem and adequately solve it.

It is an object of the present invention, therefore, to provide a method of immobilizing aqueous waste, by solidifying the waste.

It is an additional object of the present invention to provide a method of immobilizing aqueous waste through the formation of AFm phases.

It is a further object of the present invention to provide a method of immobilizing aqueous waste in as small a volume of solid waste as possible, through the uptake of a large volume of water.

These and other objects of the present invention will become more readily apparent from the following detailed description and appended claims.

DETAILED DESCRIPTION OF PREFERRED EMBODIMENTS

As used herein, the term "aqueous waste" refers to water-based waste, such as that generated by various chemical manufacturing, nuclear power or weapons facilities and other manufacturing industries, such as food, fiber, plastics, electronics and electrical equipment, metal, plating, and the like, as well as industrial waste sources from other activities. The terms "low level nuclear waste" and "low level radioactive waste" are used interchangeably and refer to aqueous waste having low levels of radioactivity which is generated by processing nuclear materials. The methods of the present invention can be used on any aqueous waste stream containing undesirable levels of nitrate ions and nitrite ions. Radioactive waste material will contain various amounts of radioactive species, for example uranium, cesium, strontium, technetium. The waste may also comprise various heavy metals, and other harmful compounds such as nitrates, nitrites and phosphates. Nitrates and nitrates in combination may be in concentrations exceeding 1 molar. Other types of aqueous waste, having other hazardous species, in addition to nitrate ions and nitrite ions, can also be treated with the methods of the present invention.

The present invention provides a method of immobilizing aqueous waste comprising the steps of: mixing the waste with a compound having the formula Me(II)O or Me(II)(OH)$_2$ and a suitably reactive source of alumina including but not limited to bauxite ore, alumina hydrates, transition aluminas, alpha alumina, and alumina-containing compounds having the formula Me(II)O.Al$_2$O$_3$ where Me(II) is a cation selected from the group consisting of Ca, Ba, Sr, Mn, Zn and combinations thereof. Alumina may be partially or completely replaced by Fe and/or Cr to produce a compound or mixture of compounds having the general formula: $3Me(II)O.R_2O_3.Me(II)(NO_x)_2.nH_2O$ where R=Al, Fe or Cr or combinations thereof, x=2 or 3 and n=10 or higher. Although Me(II) coordinated with $NO_x$ may be partially replaced by 2Na, the extent of such replacement has not been established.

In alternative embodiments, compounds having the formula $R_2O_3$, $R(OH)_3$ or ROOH can be added in combination with Me(II)(OH)$_2$ or Me(II)O to the waste, or these can be mixed together separately and then added to the waste.

Preferably, Me(II) is Ca and R is Al or Fe. Also preferably, the source of Ca is CaO or Ca(OH)$_2$.

Mixing can be accomplished by simply adding the ingredients together and stirring, by any method; no particular order of addition is necessary, and any method of combining the ingredients is contemplated as being within the present invention. The initial reaction may be facilitated by stirring or agitation, and may be carried out in the presence or absence of other constituents. These constituents may include Portland cement, which is anticipated to contribute to strength, and sources of reactive silica (silica fume) which are anticipated to react with sodium and hydroxyl. It is not expected that aluminosilicate will form, but rather an alkali silicate which may also contain some Ca. In the event that a source of reactive silica is added, the amount of Ca(OH)$_2$ added to support reactions 1-4 below should be adjusted accordingly. Compositional adjustment is based on the formation of calcium (or other cation) silicate hydrate of the approximate composition, $1.7CaO.SiO_2.4H_2O$. Thus, for each mole of calcium silicate hydrate formed, 1.7 moles of CaO or Ca(OH)$_2$ will be required.

Constituents can be mixed with commercial equipment such as that used to mix Portland cement or mortar, and mixing can occur at room temperature. Solidification is anticipated to initiate within several hours. As an example, CaO.Al$_2$O$_3$ can be added as one compound or CaO can be added separately from the Al$_2$O$_3$, or these materials can be mixed together before adding them to the waste. If Fe is used in place of Al, a preferred form is as $2CaO.Fe_2O_3$, dicalcium ferrite or as commercially available colloidal Fe$_2$O$_3$. $2CaO.Fe_2O_3$, can be produced by reacting suitable proportions of CaCO$_3$ with Fe$_2$O$_3$ or Fe$_3$O$_4$ at about 1250° C. followed by grinding to Portland cement fineness.

When the above described ingredients are mixed together with a waste material having nitrate or nitrite ions, the following reactions occur and serve to immobilize and solidify the waste:

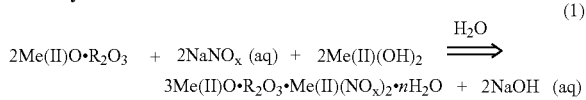

(1)

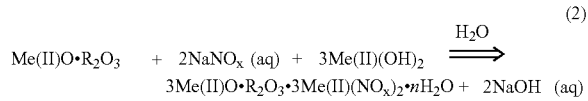

(2)

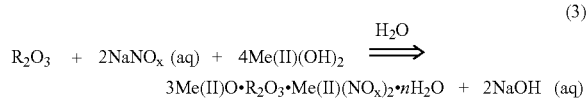

(3)

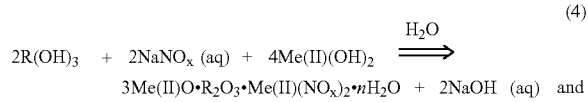

(4)

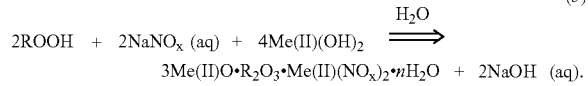

(5)

2ROOH + 2NaNO$_x$ (aq) + 4Me(II)(OH)$_2$ $\xrightarrow{H_2O}$
3Me(II)O·R$_2$O$_3$·Me(II)(NO$_x$)$_2$·$n$H$_2$O + 2NaOH (aq).

Me(II) is any metal whose primary oxidation state is 2: that is, any metal which forms a divalent cation in solution, such as Ca++ or Ba++. Sources of Al, when Al is used, may be commercial products including: CaO.Al$_2$O$_3$, Al(OH)$_3$, AlOOH, Al$_2$O$_3$ itself and bauxite ore.

In all of the above equations, Me(II)(OH)$_2$ can be replaced by Me(II)O, and Me(II) is a cation selected from the group consisting of Ca, Ba, Sr, Mn, Zn, and combinations thereof, R is selected from the group consisting of Al, Fe, Cr and combinations thereof;

x is 2 or 3, and n is at least 10, unless the mixture is intentionally dried.

However, depending on the availability of internal moisture it may higher. Work by Brown and Dumm demonstrate that the following hydration states exist for the calcium alumino nitrate: 10, 12, 16. J Q Dumm and P W Brown, "Phase assemblages in the system Ca(OH)$_2$.Al$_2$O$_3$.Ca(NO$_3$)$_2$.H$_2$O", *Advances in Cement Research*, Vol. 8, 143 (1996).

In a preferred embodiment, calcium aluminate cement (principally particulate monocalcium aluminate, CaO.Al$_2$O$_3$) is added to the aqueous waste in combination with a hydroxide such as calcium hydroxide, and the nitrate ions are immobilized via the following reaction involving the commercially-available calcium aluminate cement:

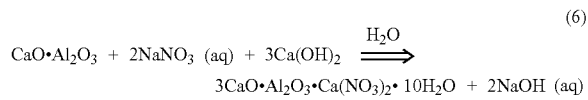

(6)

The resulting material is a solid, which can be disposed of more easily than the high volume aqueous waste.

In prior art methods, in which silicate materials are used (for example clays, cements, and the like), sodium or calcium aluminosilicate hydrates form when aluminosilicates are present. See, for example, U.S. Pat. No. 5,539,140, which describes the formation of these compounds. It has been shown that fly ashes (clays which have been subject to high temperatures as coal is burned) reacted with highly alkaline solutions form aluminosilicates, indicating that the alumina is tied up as an alkali alumino silicate (as disclosed in U.S. Pat. No. 3,274,784) and is not available to form 3CaO.Al$_2$O$_3$.Ca(NO$_3$)$_2$.nH$_2$O. Palomo, Grutzeck and Blanco, "Alkali-activated fly ashes: A cement for the future," *Cement and Concrete Research* 29, pp. 1323-1329 (1999)

LaRosa-Thompson produced a Ph.D thesis 1995 (Available from Dissertation Abstract Services, Ann Arbor MI and at the Pennsylvania State University Library) entitled "Formation of Tobermorite at 150° C. in the systems CaO—Al$_2$O$_3$—SiO$_2$—H$_2$O and Na$_2$O—CaO—Al$_2$O$_3$—SiO$_2$—H$_2$O." In the literature survey of this thesis LaRosa-Thompson reviewed compounds formed at lower temperatures, and the review shows that alumina substitutes into calcium silicate hydrates formed at pH values cited by D'Arcy (U.S. Pat. No. 3,274,784). At higher pH values (which cannot be attained by the addition of Ca(OH)$_2$ alone and rather require the presence of NaOH) LaRosa-Thompson cites the formation of zeolites (alkali or alkaline earth-containing alumino silicate hydrates). Thus, the alumina present in clays (aluminosilicates) is not intrinsically available to form 3CaO.Al$_2$O$_3$.Ca(NO$_x$)$_2$.nH$_2$O.

Additionally, when silicates are present, the compounds formed are much less soluble than the compounds formed in the method of the present invention, because thermodynamics demands that the least soluble compounds form. Thus, the methods of present invention immobilize and solidify the waste by forming compounds which are not preferentially formed in the presence of silicates or silicon-containing compounds. A source of silica may be added if it is desired to form sodium silicates to reduce the concentrations of sodium and hydroxyl which are present. Reactive silica (SiO$_2$) is a type of acid: SiO$_2$+2H$_2$O=H$_4$SiO$_4$=silicic acid, and in the presence of a base such as Ca(OH)$_2$ or NaOH, a salt forms. For Ca(OH)$_2$ this salt is calcium silicate hydrate, for NaOH this salt is sodium silicate. Depending on the extent of polymerization of the silicate tetrahedra, various Na to SiO$_2$ ratios are possible, so there is no fixed composition.

If it is desired to incorporate all the nitrate or nitrite present in the aqueous waste then the minimum molar proportion of Me(II) needs to be about 2 times that of the NO$_x$ and the minimum molar proportion of R$_2$O$_3$ needs to be about 0.5 times of that of the NO$_x$.

As mentioned previously above, the methods of the present invention result in a much greater uptake of water, as compared with previous methods. The water uptake on a molar basis at normal (room) temperature will be at a minimum, about 5 times the molarity of the nitrate or nitrite uptake. Depending on the hydration state of the nitrate salt formed, this molar ratio of nitrate to water in 3Me(II)O.R$_2$O$_3$.Me(II)(NO$_x$)$_2$.nH$_2$O may be 5:1, 6:1, or 8:1, indicating the uptake of 5, 6 or 8 moles of water taken up per mole of nitrate or nitrite immobilized. This is also in contrast with prior methods, in which using combinations of Portland cement, fly ash, blast furnace slag, silica fume, clays (attapulgite, Indian red pottery clay), may immobilize about 4 moles of water per mole of calcium silicate hydrate (1.7CaO.SiO$_2$.4H$_2$O). Some water will also be taken up in forming silica gel (SiO$_2$.2H$_2$O) or as alkali silicates (Na$_2$O.SiO$_2$.yH$_2$O, where y is 6 or less. Thus, prior methods do not result in the uptake of as much water as that possible with the methods of the present invention.

Additionally, with regard to the use of cement materials, 3CaO.Al$_2$O$_3$ is present in Portland cement, in an amount up to about 12%. However, sulfate is also added to Portland cement to form 3CaO.Al$_2$O$_3$.CaSO$_4$.12H$_2$O, and this is more stable than the compounds of the present invention. Typically the molar ratio of sulfate to aluminate in a Portland cement is 0.65:1. Thus, of the tricalcium aluminate present in Portland cement only about 35% of it is potentially available to form 3CaO.Al$_2$O$_3$.Ca(NO$_x$)$_2$.nH$_2$O. Typically the 3CaO.Al$_2$O$_3$ content of Portland cement is about 10% by weight, so only about 3% of the weight of Portland cement used contains the reactants needed to form 3CaO.Al$_2$O$_3$.Ca(NO$_x$)$_2$.10H$_2$O. Commercially-available calcium aluminate cements are primarily composed of $CaO.Al_2O_3$, with minor amounts of $CaO.2Al_2O_3$ also present. Additionally, depending on the grade of the calcium aluminate cement, $Al_2O_3$ is added. Thus, the constituents needed to produce $3CaO.Al_2O_3.Ca(NO_x)_2.10H_2O$ are present in much greater proportions with the use of this material.

If the nitrate ions or nitrite ions are immobilized in a solid and Na is not, the remaining solution will become a highly basic NaOH solution. Anticipating this, other constituents can be added to react with NaOH. These could include sources of reactive silica (silica fume, $SiO_2$) or precursors which could form Na-containing clay-like minerals or zeolites The reactions of interest, as shown in formulas 1-4, will occur even in the presence of suitable silicates, as opposed to the alumina in these salts being pulled into some aluminosilicate. Such formation, if it were to occur at room temperature at all, would be very slow. As the NaOH is consumed and the basicity of the solution drops, the thermodynamic driving force for the formation of aluminosilicates will diminish to the point that such a reaction is not favored.

Other acids, in addition to the reactive silica described above, can be added to aid in the neutralizing of the NaOH. For example, phosphoric acid can also be added, to form $Na_3PO_4$. Care must be taken to ensure that the pH remains above about 10, because lower pH values cause the nitrate compounds to become unstable.

EXAMPLES

The following examples are intended to illustrate the invention and should not be construed as limiting the invention in any way.

Example 1

Producing $3CaO.Al_2O_3.Ca(NO_3)_2.10H_2O$ from Monocalcium Aluminate+Calcium Hydroxide Assume it is desired to convert 100 liters of aqueous waste solution, which is comprised of a 1.3 molar sodium nitrate solution with a sodium nitrate concentration of 1.3 mols/liter. 100 liters of this solution will contain 130 moles of $NaNO_3$ which. Immobilization of the nitrate in this amount of $NaNO_3$ will require 65 moles of $CaO.Al_2O_3$ from calcium aluminate cement and 195 moles of commercially-available $Ca(OH)_2$. Taking the molecular weight of $CaO.Al_2O_3$ to be 158 g/mol and the molecular weight of $Ca(OH)_2$ to be 74, immobilization would require the addition of 10.27 kg of monocalcium aluminate and 14.43 kg of $Ca(OH)_2$. These would be added as particulate solids by stirring or blending by any suitable means or equipment. It is anticipated that commercially available calcium aluminate cements are not pure monocalcium aluminate, consequently the proportion of calcium aluminate cement used would reflect it monocalcium aluminate content. In the subsequent reaction:
$65CaO.Al_2O_3 + 130NaNO_3 \text{(aq)} + 195Ca(OH)_2 + 520H_2O \Rightarrow 65[3CaO.Al_2O_3.Ca(NO_3)_2.10H_2O] + 130NaOH \text{(aq)}$
The net amount of water consumed in this process is 520 moles or 9.360 kg.

Example 2

Producing $CaO.Al_2O_3.Ca(NO_3)_2.10H_2O$ from $Al(OH)_3$ (Gibbsite) and $Ca(OH)_2$ Assume it is desired to convert 100 liters of aqueous waste solution, which is comprised of a 1.3 molar sodium nitrate solution with a sodium nitrate concentration of 1.3 mols/liter. 100 liters of this solution will contain 130 moles of $NaNO_3$ which. Immobilization of the nitrate in this amount of $NaNO_3$ will require 130 moles of commercially available Gibbsite and 260 moles of commercially-available $Ca(OH)_2$. Taking the molecular weight of Gibbsite to be 78 g/mol and the molecular weight of $Ca(OH)_2$ to be 74, immobilization would require the addition of 10.14 kg Gibbsite and 19.24 kg of $Ca(OH)_2$. These would be added as particulate solids by stirring or blending by any suitable means or equipment. In the subsequent reaction:

$130Al(OH)_3 + 130NaNO_3\text{(aq)} + 260Ca(OH)_2 + 260H_2O \Rightarrow 65[3CaO.Al_2O_3.Ca(NO_3)_2.10H_2O] + 130NaOH\text{(aq)}$.

This example is intended to demonstrate that crushed and ground bauxite ore can also be used. Depend on its source and purity, the mineral bauxite is impure gibbsite. If the bauxite had been subjected to elevated temperatures and pressure during its formation, forms of AlOOH may also be present. Proportioning of reactants would recognize the amounts and Al-containing solids present.

Example 3

Producing $CaO.Fe_2O_3.Ca(NO_3)_2.10H_2O$ from $2CaO.Fe_2O_3$ and $Ca(OH)_2$

Assume it is desired to convert 100 liters of aqueous waste solution, which is comprised of a 1.3 molar sodium nitrate solution with a sodium nitrate concentration of 1.3 mols/liter. 100 liters of this solution will contain 130 moles of $NaNO_3$ which. Immobilization of the nitrate in this amount of $NaNO_3$ will require 65 moles of dicalcium ferrite $(2CaO.Fe_2O_3)$ and 130 moles of commercially-available $Ca(OH)_2$. Taking the molecular weight of dicalcium ferrite to be 272 g/mol and the molecular weight of $Ca(OH)_2$ to be 74, immobilization would require the addition of 17.68 kg dicalcium ferrite and 9.62 kg of $Ca(OH)_2$. These would be added as particulate solids by stirring or blending by any suitable means or equipment. In the subsequent reaction:
$65[2CaO.Fe_2O_3] + 130NaNO_3 \text{(aq)} + 130Ca(OH)_2 + 585H_2O \Rightarrow 65[3CaO.Fe_2O_3.Ca(NO_3)_2.10H_2O] + 130NaOH$ (aq). Dicalcium ferrite is not a commercial product but can be produced by reacting an intimate mixture of particulate $CaCO_3$ and $Fe_2O_3$. A molar ratio of $CaCO_3:Fe_2O_3$ of 2:1 will produce $2CaO.Fe_2O_3$ at complete reaction. It is anticipated that it may be desirable to produce $2CaO.Fe_2O_3$ in combination with CaO. In that instance the molar ratio of $CaCO_3:Fe_2O_3$ will be in excess of 2:1. The particulate reactants can be blended by any convenient means to produce a homogeneous mixture of particles. This mixture is then heated to approximately 120° C. at any convenient heating rate maintained 1200 C for several hours, or until reaction is complete, and then cooled to room temperature at any rate. The product solid(s) are then ground by any convenient means to an average particle size which may range from a few microns or less to 50 microns or more. Other sources of Fe can be used in producing $2CaO.Fe_2O_3$. These may include FeO or $Fe_3O_4$. The molar ratios of reactants require adjustment depending on the compositions of the reactants.

Example 4

Producing $CaO.Al_2O_3.Ca(NO_3)_2.10H_2O$ from Gibbsite and $Ca(OH)_2$ in the Presence of a Source of Reactive Silica (Silica Fume) to Partially Convert NaOH to Sodium Silicate $CaO.Al_2O_3.Ca(NO_3)_2.10H_2O$ would be produced as described in Example 2 above. In addition to the above-cited ingredients, silica fume, a by-product from the production of Si metal, or Cabosil (a commercially-available source of $SiO_2$) can be added. While the proportion of silica added may be variable, Baker and Jue (J Phys Colloidal Chem vol 54 p. 301-ff (1950)) demonstrated that $SiO_2/Na_2O$ ratio as little as approximately 6:100 is sufficient to permit the formation of $Na_3HSiO_4.5H_2O$. From example 2 above, 130 mols of NaOH=65 mols $Na_2O.H_2O$. Thus the addition of ~6(65)/100~4 mols=240 g of reactive $SiO_2$ will be sufficient to cause the formation of some $Na_3HSiO_4.5H_2O$. At higher $Na_2O$ to silica ratios $Na_2SiO_3.nH_2O$ may form. For $Na_2O$:$SiO_2$~1:10, the preferred solid is $Na_2SiO_3.5H_2O$. In this instance addition of ~6.5 mols=400 g of reactive $SiO_2$ will be sufficient to cause the formation of some $Na_2SiO_3.5H_2O$. This process, however, cannot proceed without limitation. Addition of silica to the point that the pH drops below about 10 or to the point that Ca is leached from $CaO.Al_2O_3.Ca(NO_3)_2.10H_2O$ would not be desirable.

Certain cement preparations called, for example Cement Fondu, contain minor amounts of dicalcium silicate, $2CaO.SiO_2$, along with calcium aluminates It is anticipated that the supplementary silica to form the above sodium silicate could be available from this type of cement.

Example 5

Producing $CaO.Al_2O_3.Ca(NO_3)_2.10H_2O$ in the Presence of Portland Cement to Further Consume Water and to Affect Mechanical Properties of the Hardened Grout The formation of $3Me(II)O.R_2O_3.Me(II)(NO_x)_2.nH_2O$, with or without the formation of sodium silicates, may not confer adequate properties to the solid(s) formed to facilitate all disposal strategies. In the event that it is desired to form additional solid, sources of silica alumina and calcium can be added in excess of those required to immobilize the nitrate or nitrite present in the waste. For example, 100 liters of waste may contain approximately 4000 moles of $H_2O$. According to example 1 above, 520 moles of water are consumed in forming $CaO.Al_2O_3.Ca(NO_3)_2.10H_2O$. This leaves approximately 3500 moles of free water. This free water can be immobilized by a variety of means. These include, addition of Portland cement with the formation of $1.7CaO.SiO_2.4H_2O$ and $Ca(OH)_2$. Wherein it is recognized that a continuous solid with a 28 day compressive strength in excess of 1000 psi can be formed at water-to-cement weight ratios of 1. This would require the addition of about 63 kg of Portland cement to the waste.

Water can be consumed more efficiently by the addition of excess calcium aluminate and calcium hydroxide beyond that needed to immobilize nitrate with the formation of $4CaO.Al_2O_3.13H_2O$ according to $CaO.Al_2O_3+3Ca(OH)_2+10H_2O$ ?$4CaO.Al_2O_3.13H_2O$.

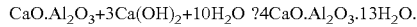

The extent to which this is necessary will depend on the disposal strategy.

Whereas particular embodiments of this invention have been described above for purposes of illustration, it will be evident to those skilled in the art that numerous variations of the details of the present invention may be made without departing from the invention as defined in the appending claims.

What is claimed is:

1. A method of immobilizing nitrate ions or nitrite ions in aqueous waste comprising the steps of:
   (a) mixing the aqueous waste with a compound selected from the group consisting of Me(II)O and $Me(II)(OH)_2$ and a compound selected from the group consisting of
   1) a compound having the formula $Me(II)O.R_2O_3$, and
   2) a compound having the formula $R_2O_3$, $R(OH)_3$ or ROOH, to provide an aqueous waste mixture,
   where Me(II) is a cation selected from the group consisting of Ca, Ba, Sr, Mn, Zn and combinations thereof, and where
   R is selected from the group consisting of Al, Fe, Cr and combinations thereof; and
   (b) allowing the aqueous waste mixture to form a solid with a crystalline structure which incorporates the nitrate ions or nitrite ions from the aqueous waste within the crystalline structure of the solid, wherein the following reaction
   immobilizes the nitrate ions or nitrite ions in the aqueous waste:

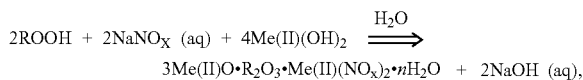

where x is 2 or 3 and n is at least 10.

2. A method of immobilizing nitrate ions or nitrite ions in aqueous waste comprising the steps of:
   (a) mixing the aqueous waste with a compound selected from the group consisting of Me(II)O and $Me(II)(OH)_2$ and a compound selected from the group consisting of
   1) a compound having the formula $Me(II)O.R_2O_3$, and
   2) a compound having the formula $R_2O_3$, $R(OH)_3$ or ROOH, to provide an aqueous waste mixture,
   where Me(II) is a cation selected from the group consisting of Ca, Ba, Sr, Mn, Zn and combinations thereof, and where
   R is selected from the group consisting of Al, Fe, Cr and combinations thereof; and
   (b) allowing the aqueous waste mixture to form a solid with a crystalline structure which incorporates the nitrate ions or nitrite ions from the aqueous waste within the crystalline structure of the solid,
   wherein the following reaction immobilizes the nitrate ions or nitrite ions in the aqueous waste:

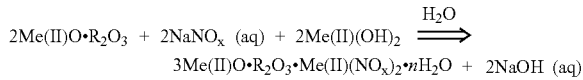

where x is 2 or 3 and n is at least 10.

3. A method of immobilizing nitrate ions or nitrite ions in aqueous waste comprising the steps of:
   (a) mixing the aqueous waste with a compound selected from the group consisting of Me(II)O and $Me(II)(OH)_2$ and a compound selected from the group consisting of
   1) a compound having the formula $Me(II)O.R_2O_3$, and
   2) a compound having the formula $R_2O_3$, $R(OH)_3$, or ROOH, to provide an aqueous waste mixture,
   where Me(II) is a cation selected from the group consisting of Ca, Ba, Sr, Mn, Zn and combinations thereof, and where
   R is selected from the group consisting of Al, Fe, Cr and combinations thereof; and
   (b) allowing the aqueous waste mixture to form a solid with a crystalline structure which incorporates the nitrate ions or nitrite ions from the aqueous waste within the crystalline structure of the solid, wherein the following reaction immobilizes the nitrate ions or nitrite ions in the aqueous waste:

$$Me(II)O \cdot R_2O_3 + 2NaNO_x \text{ (aq)} + 3Me(II)(OH)_2 \xrightarrow{H_2O} 3Me(II)O \cdot R_2O_3 \cdot Me(II)(NO_x)_2 n H_2O + 2NaOH \text{ (aq)},$$

where x is 2 or 3 and n is at least 10.

4. A method of immobilizing nitrate ions or nitrite ions in aqueous waste comprising the steps of:
(a) mixing the aqueous waste with a compound selected from the group consisting of Me(II)O and Me(II)(OH)$_2$ and a compound selected from the group consisting of 1) a compound having the formula Me(II)O.R$_2$O$_3$, and 2) a compound having the formula R$_2$O$_3$, R(OH)$_3$ or ROOH, to provide an aqueous waste mixture,
where Me(II) is a cation selected from the group consisting of Ca, Ba, Sr, Mn, Zn and combinations thereof, and where
R is selected from the group consisting of Al, Fe, Cr and combinations thereof; and
(b) allowing the aqueous waste mixture to form a solid with a crystalline structure which incorporates the nitrate ions or nitrite ions from the aqueous waste within the crystalline structure of the solid,
wherein the following reaction immobilizes the nitrate ions or nitrite ions in the aqueous waste:

$$R_2O_3 + 2NaNO_x \text{ (aq)} + 4Me(II)(OH)_2 \xrightarrow{H_2O} 3Me(II)O \cdot R_2O_3 \cdot Me(II)(NO_x)_2 n H_2O + 2NaOH \text{ (aq)},$$

where x is 2 or 3 and n is at least 10.

5. A method of immobilizing nitrate ions or nitrite ions in aqueous waste comprising the steps of:
(a) mixing the aqueous waste with a compound selected from the group consisting of Me(II)O and Me(II)(OH)$_2$ and a compound selected from the group consisting of 1) a compound having the formula Me(II)O.R$_2$O$_3$, and 2) a compound having the formula R$_2$O$_3$, R(OH)$_3$ or ROOH, to provide an aqueous waste mixture,
where Me(II) is a cation selected from the group consisting of Ca, Ba, Sr, Mn, Zn and combinations thereof, and where
R is selected from the group consisting of Al, Fe, Cr and combinations thereof; and
(b) allowing the aqueous waste mixture to form a solid with a crystalline structure which incorporates the nitrate ions or nitrite ions from the aqueous waste within the crystalline structure of the solid,
wherein the following reaction immobilizes the nitrate ions or nitrite ions in the aqueous waste:

$$2R(OH)_3 + 2NaNO_x \text{ (aq)} + 4Me(II)(OH)_2 \xrightarrow{H_2O} 3Me(II)O \cdot R_2O_3 \cdot Me(II)(NO_x)_2 \cdot n H_2O + 2NaOH \text{ (aq)},$$

where x is 2 or 3 and n is at least 10.

6. The method any one of claims 1 through 5, wherein Me(II) is Ca.

7. The method of any one of claims 1 through 5, wherein R is Al.

8. The method of any one of claims 1 through 5, wherein Me(II) is Sr.

9. The method of any one of claims 1 through 5, wherein R is Fe.

10. The method of any one of claims 1 through 5, wherein Me(II) is Ca and R is Al.

11. The method of any one of claims 1 through 5, wherein Me(II) is Ca and R is Fe.

12. The method of any one of claims 1 through 5, wherein the solidified waste is formed in an exothermic reaction and provides hydrated compounds, and is characterized as having a crystalline structure which incorporates the nitrate ions or nitrite ions from the aqueous waste within the crystalline structure of the solid.

13. The method of any one of claims 1 through 5, wherein Me(1)(OH)$_2$ is replaced by Me(II)O.

14. The method of any one of claims 1 through 5, wherein the aqueous waste is low level nuclear waste, wherein formation of droplets of solution on the exterior surface of the solid of step (b) is resisted.

* * * * *